US008533149B2

(12) United States Patent
Roediger et al.

(10) Patent No.: US 8,533,149 B2
(45) Date of Patent: Sep. 10, 2013

(54) BATCH MANAGEMENT SYSTEMS AND METHODS

(75) Inventors: Karl Christian Roediger, Dielheim (DE); Yves Bauer, Hainburg (DE); Gregor Rieken, Walldorf (DE); Sven-Eric Eigemann, Sandhausen (DE); Juergen Wettengl, Wottenberg (DE); Juergen Hausner, Walldorf (DE); Martin Zieger, Walldorf (DE); Christoph Huber, Walldorf (DE); Lilly Yuan, Walldorf (DE); Stephen Cloughley, Yardley, PA (US); Thomas Rumbach, Heidelberg (DE); Reinhard Brede, Walldorf (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/341,322

(22) Filed: Dec. 30, 2011

(65) Prior Publication Data

US 2013/0173596 A1    Jul. 4, 2013

(51) Int. Cl.
*G06F 7/00*    (2006.01)

(52) U.S. Cl.
USPC .......................................... 707/601; 707/703

(58) Field of Classification Search
USPC ................ 707/601, 703; 700/108, 213, 115, 700/109, 110; 705/318
See application file for complete search history.

(56) References Cited

U.S. PATENT DOCUMENTS

| | | | |
|---|---|---|---|
| 6,594,535 B1* | 7/2003 | Costanza | 700/97 |
| 7,035,877 B2* | 4/2006 | Markham et al. | 1/1 |
| 7,248,938 B2* | 7/2007 | Scalfani et al. | 700/115 |
| 7,380,213 B2* | 5/2008 | Pokorny et al. | 715/764 |
| 7,401,728 B2* | 7/2008 | Markham et al. | 235/376 |
| 7,515,984 B2* | 4/2009 | Scalfani et al. | 700/110 |
| 7,761,180 B2* | 7/2010 | Scalfani et al. | 700/109 |
| 7,882,438 B2* | 2/2011 | Markham et al. | 715/736 |
| 2005/0143851 A1* | 6/2005 | Scalfani et al. | 700/108 |
| 2006/0191993 A1* | 8/2006 | Markham et al. | 235/376 |
| 2008/0015730 A1* | 1/2008 | Scalfani et al. | 700/213 |
| 2011/0015775 A1* | 1/2011 | Scalfani et al. | 700/115 |
| 2011/0167010 A1* | 7/2011 | Soppera et al. | 705/318 |

* cited by examiner

*Primary Examiner* — Hung T Vy
(74) *Attorney, Agent, or Firm* — Schwegman Lundberg & Woessner, P.A.

(57) ABSTRACT

Example systems and methods of managing product genealogy data across distributed systems are described. In one implementation, a method identifies a material associated with a product that is part of a product batch. Usage information associated with the material is accessed, and a handling unit associated with the product batch is identified. Delivery information associated with the product batch is also accessed. A genealogy is generated for the product batch based on the material, the usage information, the handling unit, and the delivery information.

20 Claims, 9 Drawing Sheets

BATCH MANAGEMENT SYSTEMS AND METHODS

FIELD

The present disclosure relates generally to managing data and, more specifically, to the management of product genealogy data across distributed systems.

BACKGROUND

A product manufacturing and distribution process often includes multiple activities performed by a variety of users, systems or entities. A batch of products are distributed to end users through a supply network, which may include multiple storage facilities and distribution mechanisms. A particular batch of products may be delivered to multiple distributor warehouses, from which the products are distributed to retail outlets, local distributors, end users, and the like. For example, a product manufacturing process may begin with partial batch quantities of raw material with subsequent stages of partial batches of multiple ingredients ultimately creating a batch of finished products. This manufacturing process creates a product batch genealogy that identifies which partial quantities of batches at various stages of production went into the production of a finished product.

Traceability of a product batch genealogy is important in many situations. For example, if a malfunctioning machine is identified, it may be important to determine which batches at any stage of the respective production process may have been produced on the machine during a certain time period. This information is necessary to recall these batches and related batches, including finished product batches that may have already been distributed to customers.

Typically, different systems are used during the multiple activities of the manufacturing and distribution process. For example, an entity producing the batch of products uses one system, a warehousing entity uses another system, and a distribution entity uses yet another system. Typically, these multiple systems do not support the tracking of a product genealogy throughout the manufacturing and distribution process. The product genealogy information is important when a user needs to identify the location and usage of all products in a particular batch. With existing systems, a user identifies products in a batch by manually searching through data associated with each of the multiple systems. This procedure is often tedious and time-consuming, which delays communication of the product information to users and entities needing the information.

BRIEF DESCRIPTION OF THE DRAWINGS

The present disclosure is illustrated by way of example and not limitation in the figures of the accompanying drawings, in which like references indicate similar elements.

DETAILED DESCRIPTION

Figure 1:
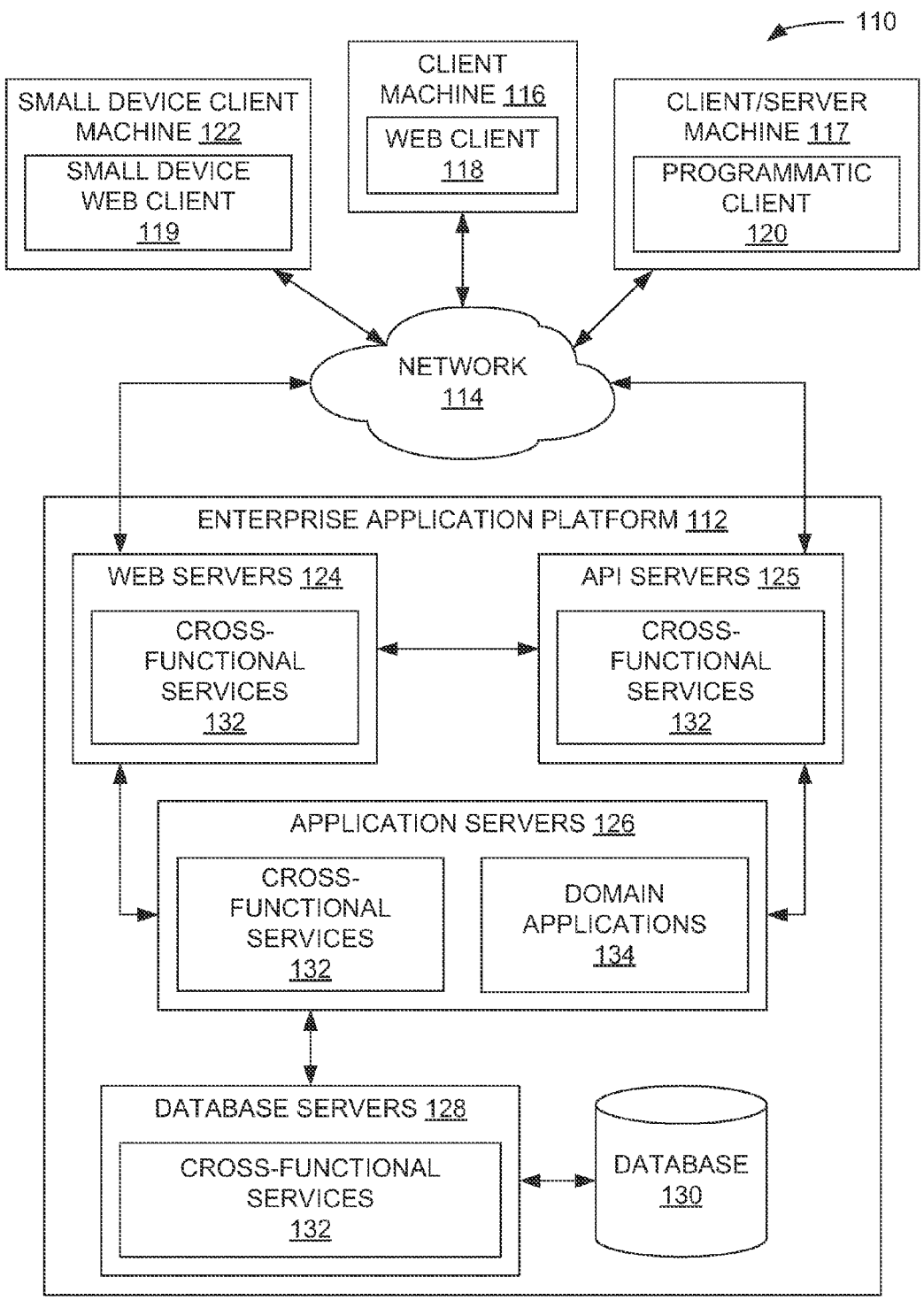
FIG. 1 is a block diagram of an example system having a client-server architecture for an enterprise application platform capable of employing the systems and methods described herein.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for managing product genealogy data across distributed systems. Examples of the genealogy data may include, but are not limited to, product batch numbers, product materials (such as raw ingredients), batch status, production dates, shipping dates, receiving warehouses, receipt date by end users, and other product-related information. A product batch includes, for example, any group of products manufactured at similar times or using similar materials/ingredients. In some embodiments, a product batch refers to products made during a common manufacturing operation.

The systems and methods described herein provide a unified approach to identifying, tracking, and linking data associated with a product genealogy. Additionally, these systems and methods automate the searching and reporting of product genealogy data for purposes of regulatory compliance, product recalls, and the like. As is described in greater detail below, a data model contains various product-related data received from multiple systems, such as material provider systems, production systems, warehouse systems, and distribution systems. Other aspects of the embodiments discussed herein may be ascertained from the following detailed description.

As discussed herein, traceability of a product batch genealogy is important in many situations, such as product recalls or product notifications. For example, to perform a product recall, a user or entity uses the product batch genealogy data to determine where the recalled batch was used. The product batch genealogy data can identify which pallets (or other handling units) are carrying the recalled batch and where those pallets are located in the distribution process. Further, the product batch genealogy data indicates a particular batch (e.g., a batch of raw material) for which portions of the particular batch were used as materials in other product batches.

The traceability of a product batch genealogy provides an understanding of both internal product usage and external distribution information based on product shipping and delivery records. For example, understanding bad batch stock or bad finished product batches that are "bad" because a bad ingredient batch was used in the production of the finished product batch and distributed to external entities or users. In another example, a supplier of a raw material batch notifies a manufacturing company that a batch delivered to the manufacturer has been identified as bad. To identify the product genealogies in which partial quantities of this procured bad batch were used, the systems and methods described herein may track purchase order data and related information.

In some embodiments, the described systems and methods utilize the product batch genealogy and related objects (e.g., handling units, delivery records, purchase orders, and serial numbers) to identify usage of a bad batch of material or ingredients procured from a supplier. The identified data is used to quickly generate a report or other notification detailing the internal and external distribution of products containing the bad batch of material or ingredients. This reporting identifies raw material batches, intermediate (e.g., semi-finished) products, and finished products throughout the product genealogy. Additionally, the reporting identifies a quantity distribution and location information for the various materials and products, all of which is produced quickly and easily using the systems and methods described herein. In some embodiments, a user activates a particular computer application to analyze the product genealogy data and generate the desired reports or notices. Additional reporting may include a material balance report that allows manufacturers to account for the balance of all product batches produced and used.

In some embodiments, a product issue notification is necessary for a finished product batch. In these embodiments, a top-down (e.g., from the finished product) product batch genealogy analysis is available through a top-down list or a graphic-based exploration of the root-cause analysis into the cause of the product issue. Once the root cause is identified (e.g., a particular ingredient batch), a bottom-up analysis based on the ingredient batch ID is performed to identify all related batches that contain the identified ingredient. The systems and methods described herein generate product genealogies that allow for both top-down and bottom-up analysis of the various materials, ingredients, interim products, and finished products throughout a specific product genealogy.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer browser developed by Microsoft Corporation of Redmond, Wash.), a small device client machine 122 with a small device web client 119 (e.g., a browser without a script engine) and a client/server machine 117 with a programmatic client 120.

Turning specifically to the enterprise application platform 112, web servers 124, and Application Program Interface (API) servers 125 are coupled to, and provide web and programmatic interfaces to, application servers 126. The application servers 126 are, in turn, shown to be coupled to one or more database servers 128 that may facilitate access to one or more databases 130. The web servers 124, Application Program Interface (API) servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third party and legacy applications with existing cross-functional services 132 and domain applications 134. Further, while the system 110 shown in FIG. 1 employs a client-server architecture, the present disclosure is of course not limited to such an architecture, and could equally well find application in a distributed, or peer-to-peer, architecture system.

Figure 2:
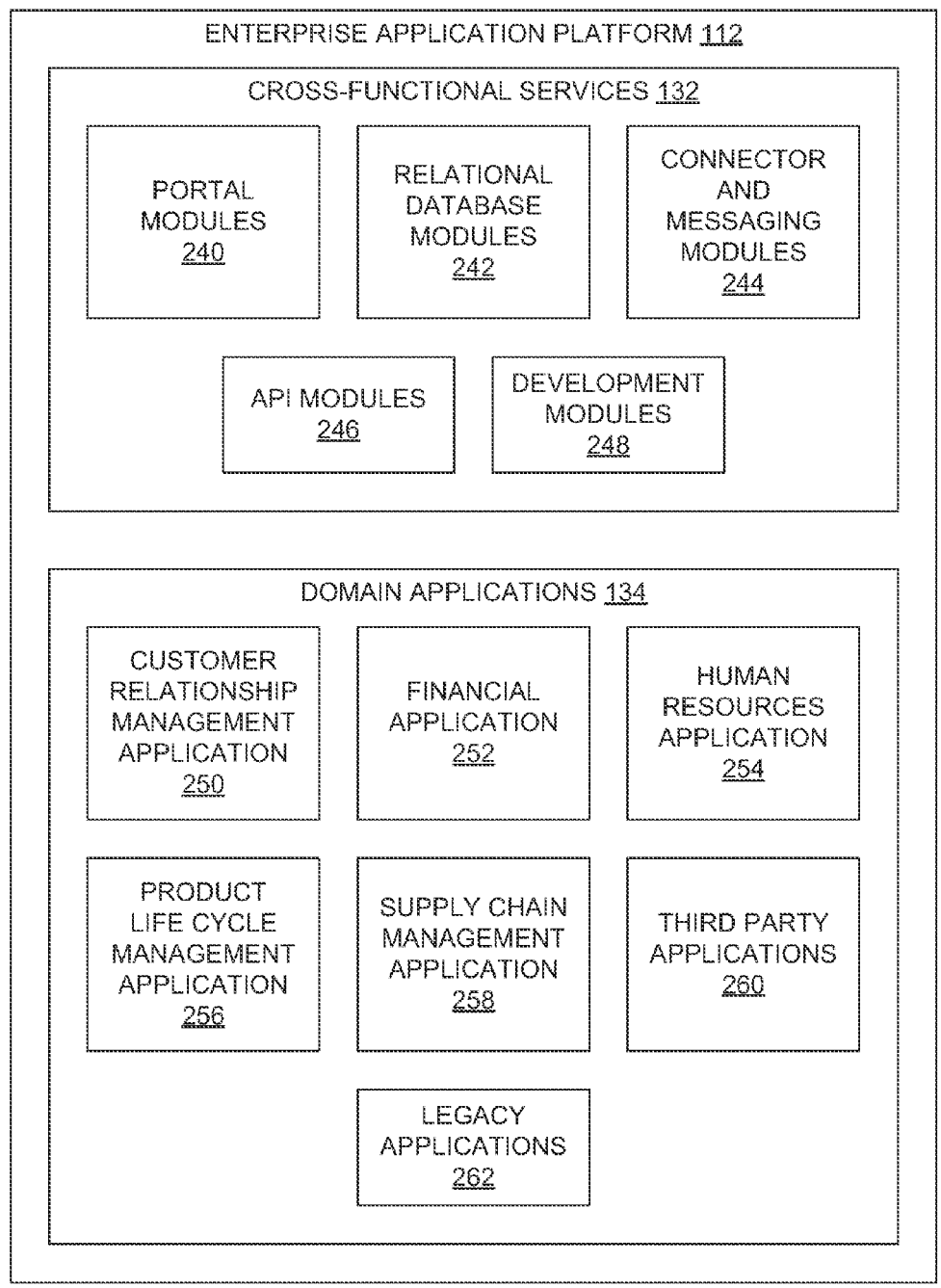
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, Application Program Interface (API) modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java, J2EE, SAP's Advanced Business Application Programming Language (ABAP) and Web Dynpro, XML, JCA, JAAS, X.509, LDAP, WSDL, WSRR, SOAP, UDDI, and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The Application Program Interface (API) modules 246 may enable the development of service-based applications by exposing an interface to existing and new applications as services. Repositories may be included in the platform as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, the customer relationship management applications 250 may enable access to and facilitate collecting and storing of relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize the financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

The human resources applications 254 may be utilized by enterprise personal and business processes to manage, deploy, and track enterprise personnel. Specifically, the human resources applications 254 may enable the analysis of human resource issues and facilitate human resource decisions based on real-time information.

The product life cycle management applications 256 may enable the management of a product throughout the life cycle of the product. For example, the product life cycle management applications 256 may enable collaborative engineering, custom product development, project management, asset management, and quality management among business partners.

The supply chain management applications 258 may enable monitoring of performances that are observed in supply chains. The supply chain management applications 258 may facilitate adherence to production plans and on-time delivery of products and services.

The third-party applications 260, as well as legacy applications 262, may be integrated with domain applications 134 and utilize cross-functional services 132 on the enterprise application platform 112.

Figure 3:
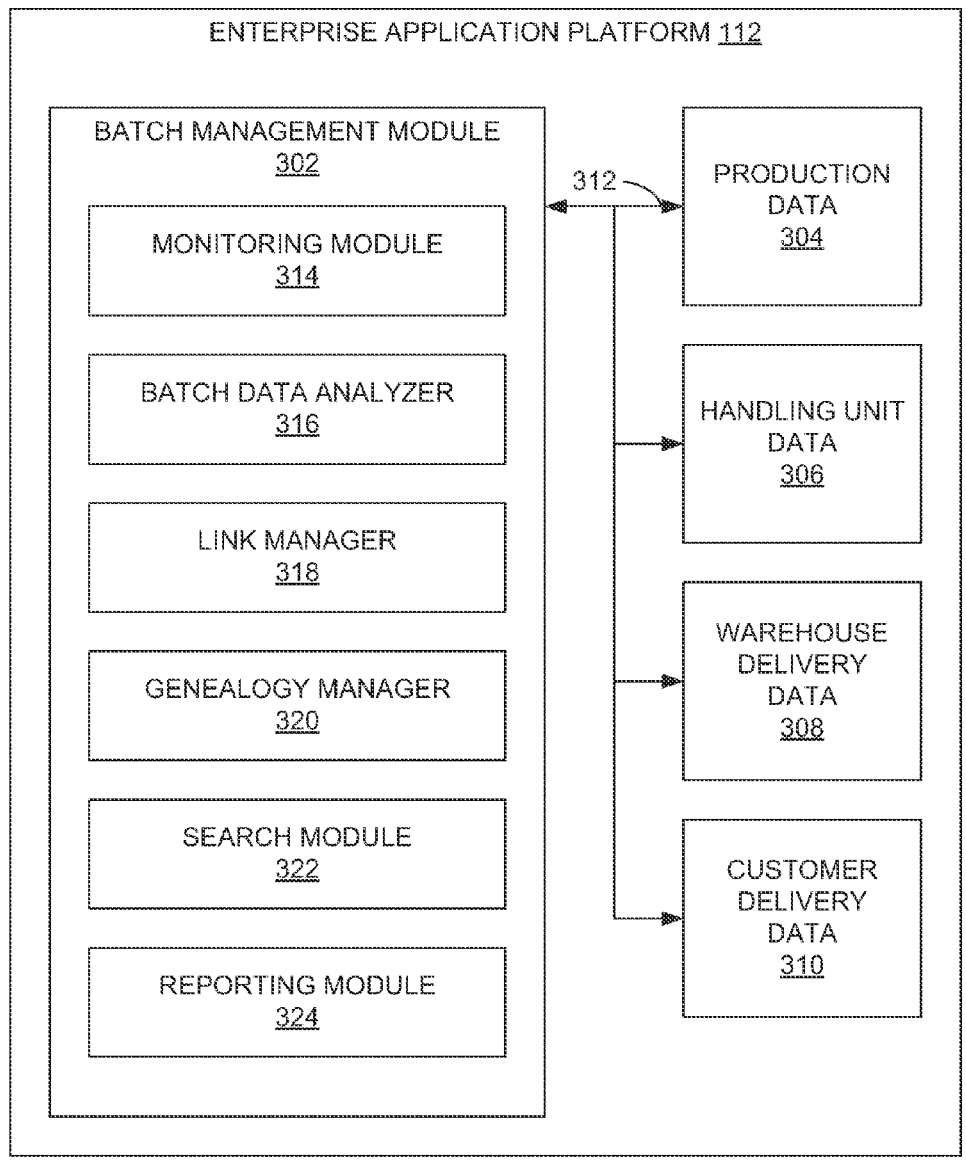
FIG. 3 is a block diagram of example applications and modules utilized in the enterprise application platform of FIG. 1 for managing batch data.

FIG. 3 is a block diagram of example applications and modules utilized in the enterprise application platform of FIG. 1 for managing batch data. A batch management module 302 receives product-related data from multiple sources. In the example of FIG. 3, batch management module 302 accesses production data 304, handling unit data 306, warehouse delivery data 308, and customer delivery data 310 via one or more data communication links 312. In some embodiments, the product-related data is stored by batch management module 302 in a data store, such as database 130 (FIG. 1). In other embodiments, the product-related data is stored in a data store maintained by the source of the data (e.g., a material provider system, a production system, a warehouse management system or a distribution system).

Batch management module 302 includes a monitoring module 314, a batch data analyzer 316, and a link manager 318. Monitoring module 314 monitors various systems and accesses data related to one or more products. As discussed herein, monitoring module 314 may monitor systems external to enterprise application platform 112, such as other systems associated with the production and distribution of products. Batch data analyzer 316 manages product-related data from different sources, such as data accessed by monitoring module 314. Link manager 318 defines and updates links between product-related data elements.

Batch management module 302 further includes a genealogy creator 320, a search module 322, and a reporting module 324. Genealogy creator 320 generates genealogies for product batches based on various product-related data and the links between the product-related data elements. Search module 322 performs various search queries on product-related data as discussed herein. In some embodiments, search module 322 provides a user interface that allows users to define search parameters, view search results, and the like. Reporting module 324 generates reports based on product-related data. In some embodiments, the reports are generated based on user-defined reporting parameters, such as report content, report frequency, and the like.

Figure 4:
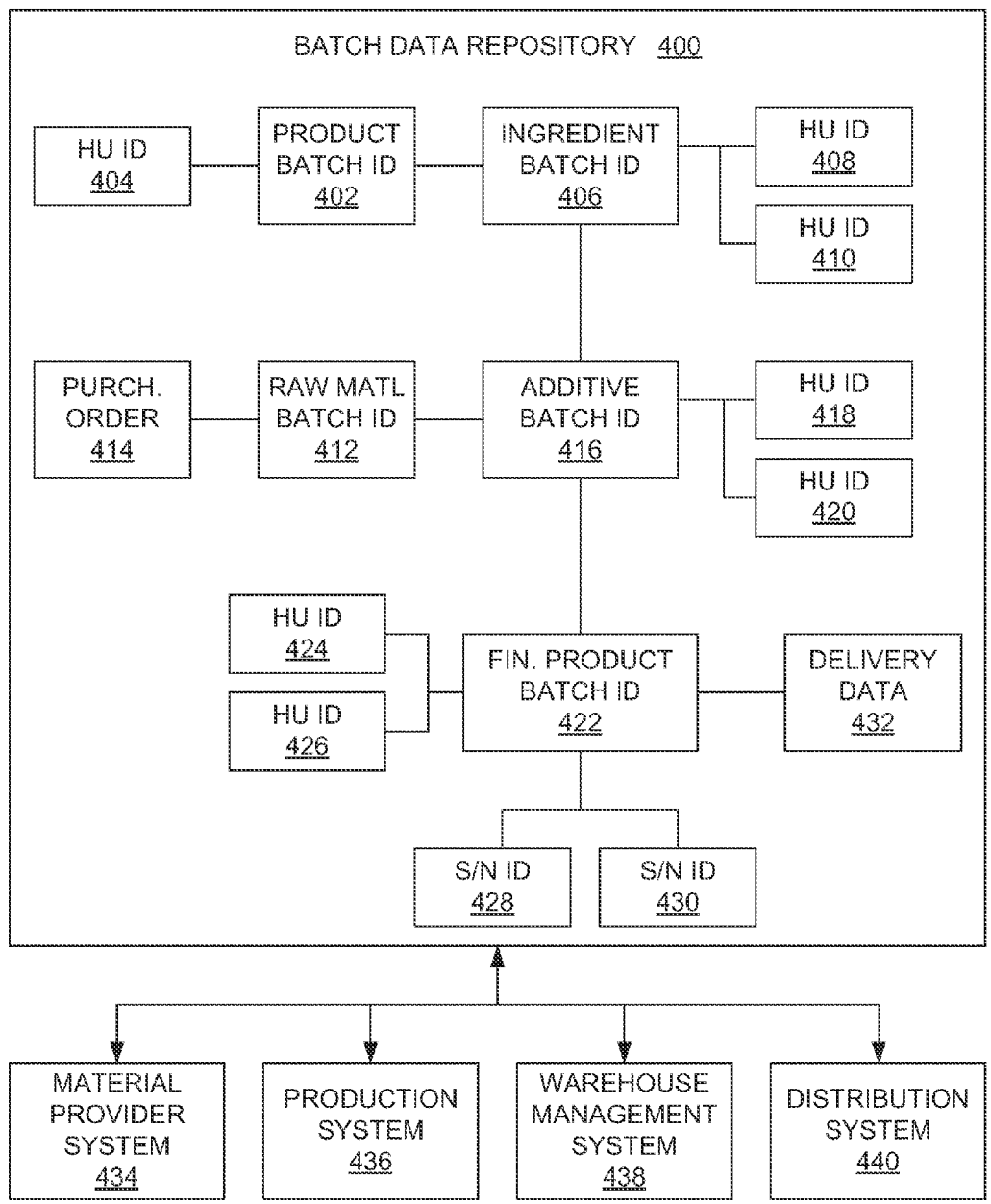
FIG. 4 is a block diagram of an example batch data repository that contains data related to various aspects of the manufacturing and distribution processes for a product.

FIG. 4 is a block diagram of an example batch data repository 400 that contains data related to various aspects of the manufacturing and distribution processes for a product. In the embodiment of FIG. 4, batch data repository 400 contains data from multiple distributed systems, including a material provider system 434, a production system 436, a warehouse management system 438, and a distribution system 440. In other embodiments, batch data repository 400 may receive data from additional systems not shown in FIG. 4.

Batch data repository 400 includes product batch genealogy data, distribution data, data regarding the batch quantity manufactured, and data regarding how the products in the batch were used or consumed. The data structure shown in FIG. 4 represents an example relationship between various data elements in batch data repository 400. The relationships between data elements are referred to herein as "associations", "links" or "linkages." In particular, batch data repository 400 contains a product batch identifier (ID) 402, which identifies a specific batch of products. Product batch ID 402 has at least one associated handling unit (HU) ID 404, which identifies a handling unit associated with the batch of products. A handling unit is a physical unit that consists of the packaging materials and the products contained therein. A handling unit is defined to include a combination of materials (or products) and packaging materials, such as a shipping container. Each handling unit identifies the batch(es) and serial number(s) for products contained within the physical unit.

An ingredient batch ID 406 is associated with product batch ID 402 as well as two HU IDs 408 and 410 (representing two different ingredients used in creating the product batch). A raw material batch ID 412 has an associated purchase order 414 and is further associated with an additive batch ID 416. An additive batch is a batch for an intermediate (or semi-finished) product which may be used as input material for further production steps or sold/transported to another location for further use. Additive batch ID 416 has two associated HU IDs 418 and 420, and is further associated with a finished product batch ID 422. Two HU IDs 424 and 426, and two serial number (S/N) IDs 428 and 430, are associated with finished product batch ID 422. Additionally, delivery data 432 is associated with finished product batch ID 422.

By maintaining the relationships among data elements as shown in FIG. 4, the systems and methods discussed herein are able to search (or trace) the entire product batch genealogy across multiple distributed systems. By aggregating all data associated with a particular product batch, searching (and report generation) is automated and performed in a timely manner. In some situations, the terms "material" and "ingredient" are equivalent, such as when they are both referring to a raw material used to produce a finished product or an intermediate product. In other situations, the term "ingredient" refers to a raw ingredient and the term "material" refers to an intermediate product or a raw ingredient that is not an active ingredient.

Figure 5:
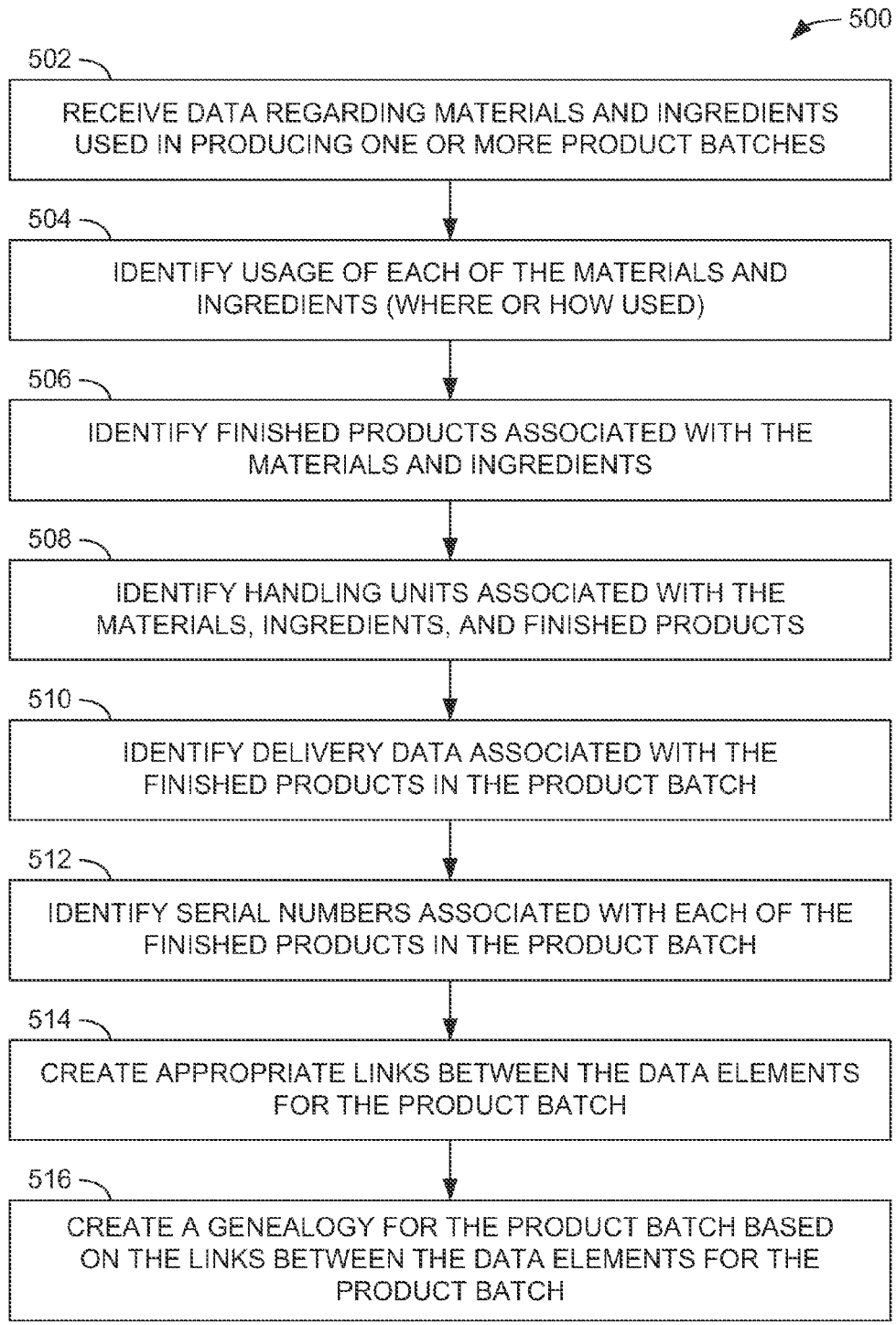
FIG. 5 is a flow diagram of an example method of collecting and aggregating product batch genealogy data.

FIG. 5 is a flow diagram of an example method 500 of collecting and aggregating product batch genealogy data. Initially, method 500 receives (or accesses) data regarding materials and ingredients used in producing one or more product batches at 502. In some embodiments, the materials and ingredients are provided by multiple different sources. The method 500 identifies a usage of each of the materials and ingredients at 504. This usage information includes where and how the materials and ingredients are used in different product batches. For example, a particular batch of milk (having its own batch ID) may be used in multiple product batches (such as yogurt, chocolate milk, and cheese).

The method 500 continues by identifying finished products associated with the materials and ingredients at 506. Additionally, the method 500 identifies handling units associated with the materials, ingredients, and finished products at 508. The method 500 also identifies delivery data associated with the finished products in the product batch at 510. The delivery data includes, for example, a delivery date, a delivery destination (such as a warehouse), and the like. If each of the finished products has an associated serial number, the method 500 identifies the serial numbers for each of the finished products in the product batch at 512. Appropriate links are then created between the various data elements in the product batch at 514. An example of the links between data elements is shown in FIG. 4. Finally, the method 500 creates a genealogy for the product batch based on the links between the data elements for the product batch at 516.

Figure 6:
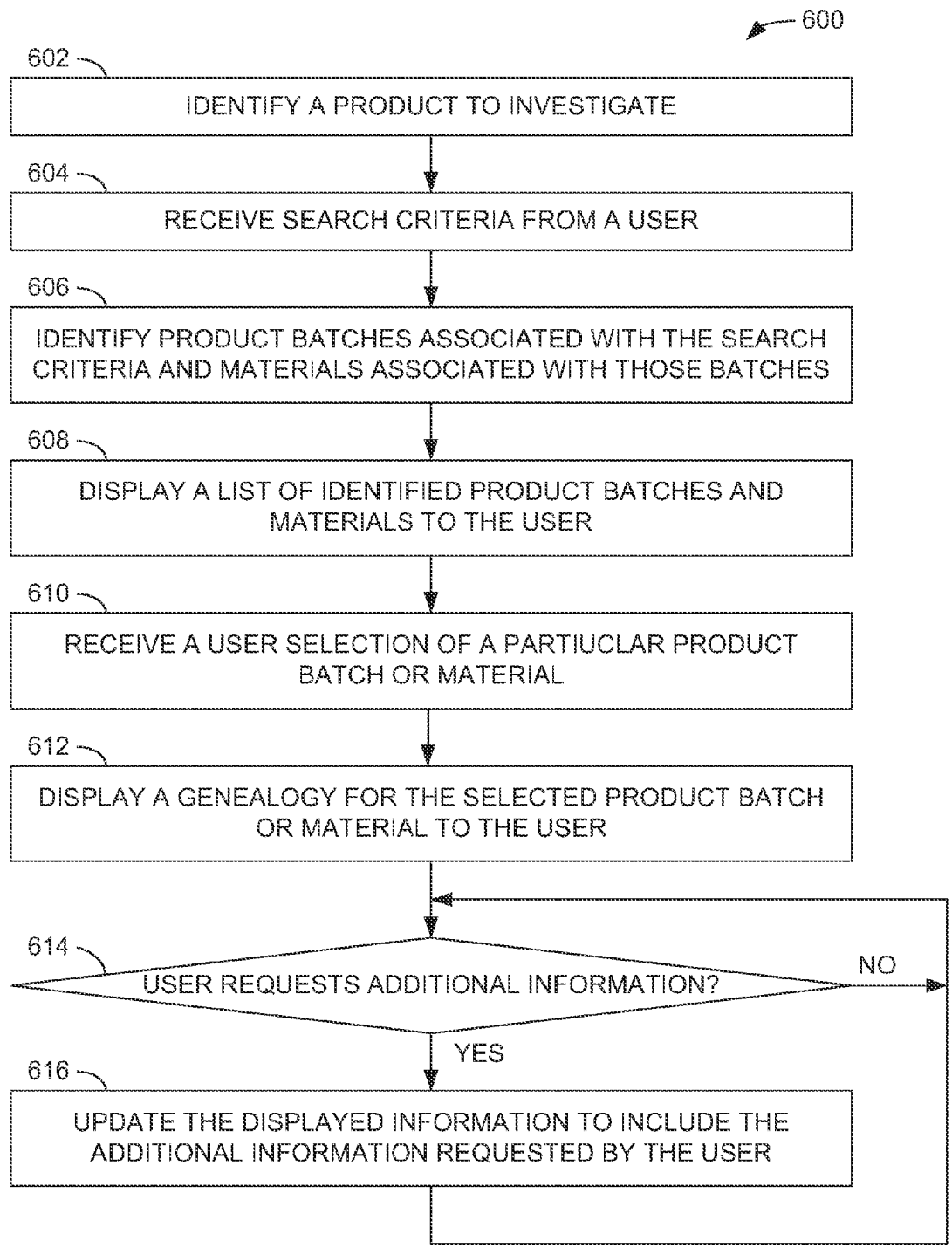
FIG. 6 is a flow diagram of an example method of displaying product batch information based on user input.

FIG. 6 is a flow diagram of an example method 600 of displaying product batch information based on user input. Initially, a user identifies a product to investigate at 602 and the user provides search criteria at 604. The search criteria may include, for example, all product batches containing an ingredient with a specific batch identifier. In this example, a problem may arise with the ingredient having the specific batch identifier, and the user wants to identify all product batches that use the problem ingredient. The method 600 continues by identifying product batches associated with the search criteria and materials associated with those product batches at 606. A list of identified product batches and materials is displayed to the user at 608. The method 600 receives a user selection identifying a particular product batch or material at 610. A genealogy for the selected product batch or material is displayed to the user at 612.

After displaying the genealogy for the selected product batch or material, the user may request additional information at 614. If additional information is requested, the method 600 updates the displayed information to include the additional information requested by the user at 616. The additional information requested by the user includes, for example, information associated with particular materials, shipping data or serial numbers associated with specific product batches.

Figure 7:
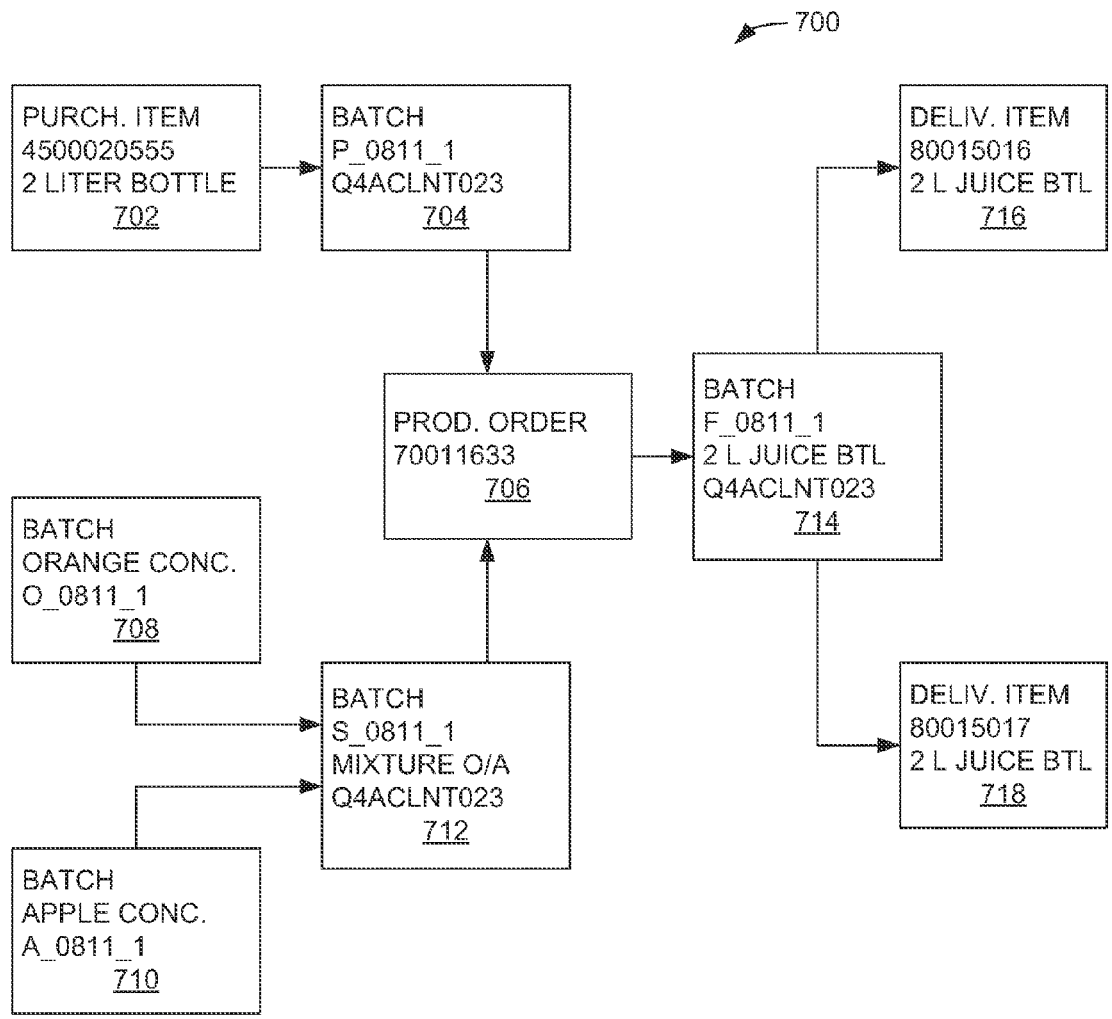
FIG. 7 is an example graphical display of a product batch genealogy.

FIG. 7 is an example graphical display 700 of a product batch genealogy. In this example, the product batch genealogy is related to the production of two liter bottles of an orange/apple juice mixture. A data element 702 identifies a purchased material (empty two liter bottles), which is associated with a batch identifier element 704. The batch identifier for the two liter bottle is "P_0811_1". A production order 706 identifies an order identifier for the product batch. In this example, the production order is for two liter bottles of orange/apple juice.

Data elements 708 and 710 identify ingredients (orange juice concentrate and apple juice concentrate) associated with the product batch. A separate batch identifier 712 is associated with the mixture of orange juice concentrate and the apple juice concentrate. A batch identifier 714 is associated with the final product (two liter bottles of the orange and apple juice concentrate mixture). Data elements 716 and 718 include delivery information for the final product. In this example, the final product was delivered to two different locations, such as two different distributor warehouses.

The example user interface display 700 allows a user to obtain additional information regarding any of the data elements 702-718 by activating the appropriate data element. For example, if a user wants additional information regarding the two liter bottle, they can activate data element 702 by clicking on the icon or other representation of that data element. Upon activation of data element 702, the display is modified to include additional information about the two liter bottle used in the product batch. In some embodiments, the additional information is displayed in a separate window or other graphical item that overlays at least a portion of user interface display 700.

Figure 8:
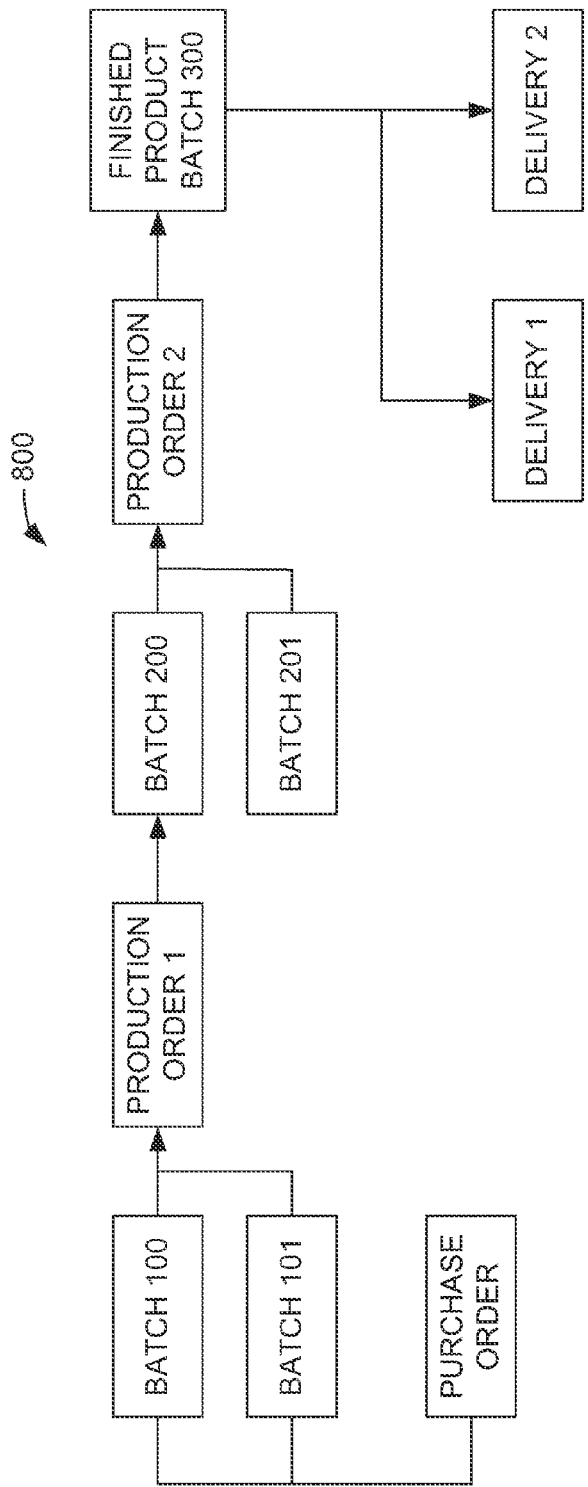
FIG. 8 is a block diagram of an example product batch genealogy.

FIG. 8 is a block diagram of an example product batch genealogy 800. The example of FIG. 8 shows various batches and other data associated with a particular product batch genealogy. In particular, a purchase order is associated with two batches (Batch 100 and Batch 101), which are associated with a first production order (Production Order 1). In this example, Batch 100 and Batch 101 are ingredients or materials purchased from a first entity, such as a material supplier. The production order defines the production of a Batch 200 using the materials contained in Batch 100 and Batch 101. Although not shown in FIG. 8, Batch 200 has associated data such as information regarding one or more handling units that contain the items associated with Batch 200 and the location of those handling units. Batch 200 is an intermediate batch that is used by one or more additional production processes.

A second production order (Production Order 2) defines the production of a Finished Product Batch 300 using Batch 200 and a Batch 201, which may be provided by another entity or produced in another part of the production process. In a particular implementation, a portion of Batch 200 is used in the production of Finished Product Batch 300, while the remaining portions of Batch 200 are used to produce different intermediate batches or different finished product batches. The Finished Product Batch 300 is then delivered to any number of warehouses, customers or other distribution entities, as identified by Delivery 1 and Delivery 2.

In some embodiments, a product batch genealogy is created by monitoring the various information associated with the production processes discussed with respect to FIG. 8. For example, when Batch 100 and Batch 101 are identified in a production order, the associations between the batches and the production order are recorded. Additional information, such as the handling unit associated with Batch 200, is recorded as part of the product batch genealogy.

The systems and methods discussed herein are capable of tracing or analyzing product batch genealogies to account for all quantities of batch material IDs procured and manufactured, as well as batch material that is not yet processed. These systems and methods support the analysis of product batch genealogies in both a top-down and a bottom-up manner to determine where certain materials, ingredients or products are being used or stored.

In some embodiments, the systems and methods described herein also maintain serial number information within the product batch genealogies. For example, finished product batches may include a list of serial numbers (or similar unique identifiers) for more specific traceability from the batch to each item produced. This serial number information allows a consumer to report a product issue with the unique serial number of an item purchased from a particular store or supplier. Based on that serial number, the associated product batch genealogy is identified along with the various materials, ingredients, intermediate batches, and the like. Further, if a product batch issue is identified by the manufacturer, the product batch genealogy data contains the specific serial numbers associated with the product batch issue. Thus, in addition to providing general product batch information, the systems and methods described herein are able to identify specific products associated with a particular product issue.

Figure 9:
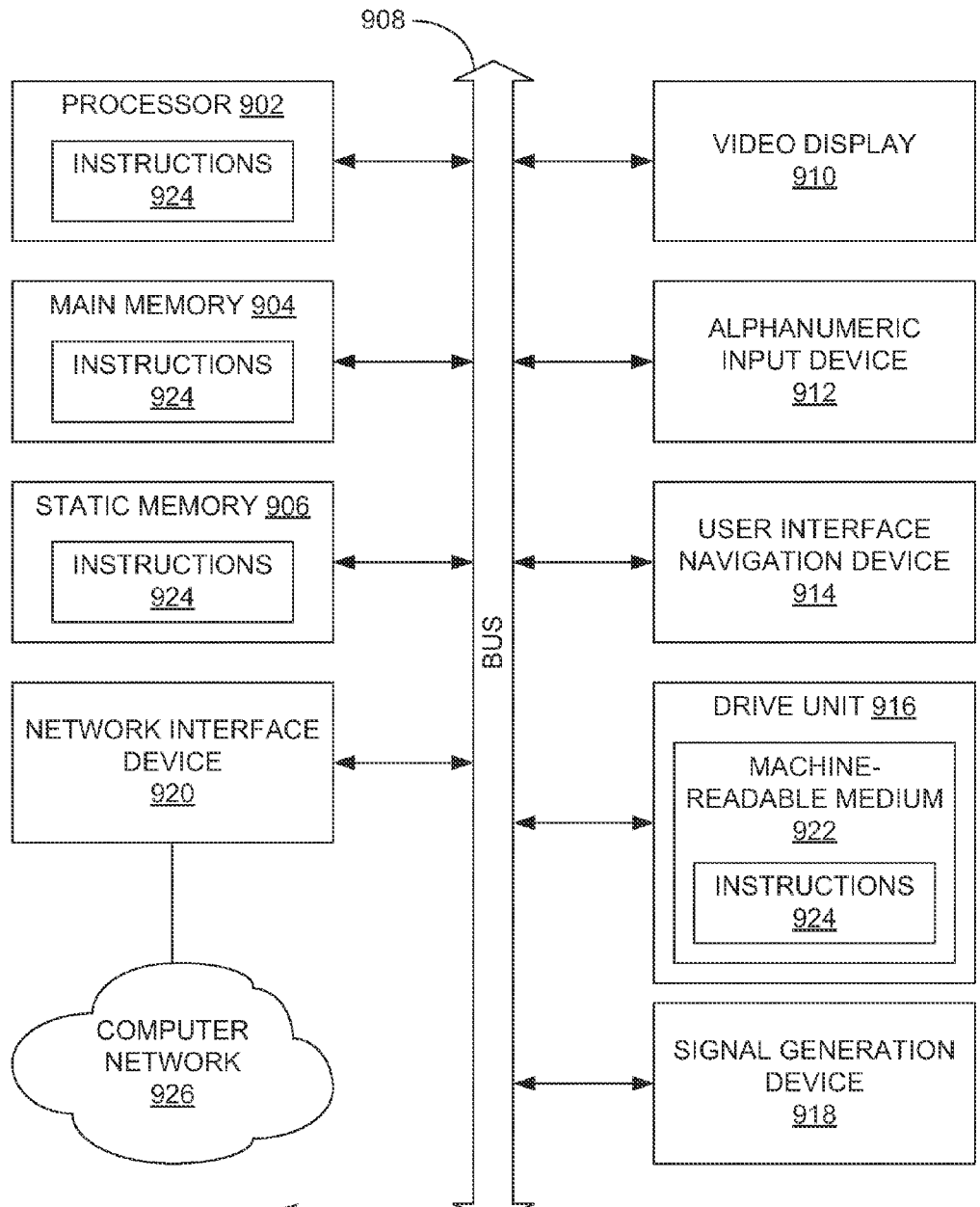
FIG. 9 depicts a block diagram of a machine in the example form of a processing system within which may be executed a set of instructions for causing the machine to perform any one or more of the methodologies discussed herein.

FIG. 9 depicts a block diagram of a machine in the example form of a processing system 900 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 900 includes a processor 902 (for example, a central processing unit (CPU), a graphics processing unit (GPU), or both), a main memory 904 (for example, random access memory), and static memory 906 (for example, static random-access memory), which communicate with each other via bus 908. The processing system 900 may further include video display unit 910 (for example, a plasma display, a liquid crystal display (LCD), or a cathode ray tube (CRT)). The processing system 900 also includes an alphanumeric input device 912 (for example, a keyboard), a user interface (UI) navigation device 914 (for example, a mouse), a disk drive unit 916, a signal generation device 918 (for example, a speaker), and a network interface device 920.

The disk drive unit 916 (a type of non-volatile memory storage) includes a machine-readable medium 922 on which is stored one or more sets of data structures and instructions 924 (for example, software) embodying or utilized by any one or more of the methodologies or functions described herein. The data structures and instructions 924 may also reside, completely or at least partially, within the main memory 904, the static memory 906, and/or within the processor 902 during execution thereof by processing system 900, with the main memory 904 and processor 902 also constituting machine-readable, tangible media.

The data structures and instructions 924 may further be transmitted or received over a computer network 926 via network interface device 920 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 900) or one or more hardware modules of a computer system (for example, a processor 902 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 902 that is configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 902 that are temporarily configured (for example, by software) or permanently configured to perform the relevant operations. Whether temporarily or permanently configured, such processors 902 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine but deployed across a number of machines. In some example embodiments, the processors 902 may be located in a single location (for example, within a home environment, within an office environment, or as a server farm), while in other embodiments, the processors 902 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method comprising:
   identifying a material associated with a product, the product being part of a product batch;
   accessing usage information associated with the material;
   identifying a handling unit associated with the product batch;
   accessing delivery information associated with the product batch; and
   generating, using one or more processors, a genealogy for the product batch based on links between the material, the usage information, the handling unit, and the delivery information.

2. The method of claim 1, further comprising identifying a plurality of serial numbers associated with the product batch.

3. The method of claim 2, the generating of the genealogy further based on the plurality of serial numbers associated with the product batch.

4. The method of claim 1, the material comprising an ingredient used to manufacture the product.

5. The method of claim 1, the generating of the genealogy including creating the links between the material, the usage information, the handling unit, and the delivery information.

6. The method of claim 1, the generating of the genealogy including creating a data model integrating definitions of the material, handling unit, and delivery information.

7. The method of claim 1, the usage information being accessed from a first system associated with a first entity and the delivery information being accessed from a second system associated with a second entity.

8. The method of claim 1, further comprising displaying the genealogy for the product batch to a user.

9. The method of claim 1, further comprising displaying a portion of the genealogy for the product batch to a user based on search criteria received from the user.

10. The method of claim 1, further comprising:
    identifying a first batch identifier associated with the material; and
    identifying a second batch identifier associated with the product batch.

11. The method of claim 10, further comprising creating a link between the first batch identifier and the second batch identifier.

12. A non-transitory computer-readable storage medium comprising instructions that, when executed by at least one processor of a machine, cause the machine to perform operations comprising:
    identifying a plurality of materials associated with a product, the product being part of a product batch;
    accessing usage information associated with the plurality of materials;
    identifying a handling unit associated with the product batch;
    accessing delivery information associated with the product batch; and
    generating a genealogy for the product batch based on links between the plurality of materials, the usage information, the handling unit, and the delivery information.

13. The non-transitory computer-readable storage medium of claim 12, further comprising instructions that cause the machine to perform operations comprising identifying a plurality of serial numbers associated with the product batch.

14. The non-transitory computer-readable storage medium of claim 13, the generating of the genealogy further based on the plurality of serial numbers associated with the product batch.

15. The non-transitory computer-readable storage medium of claim 12, further comprising instructions that cause the machine to perform operations comprising:
    identifying a first batch identifier associated with one of the plurality of materials; and
    identifying a second batch identifier associated with the product batch.

16. The non-transitory computer-readable storage medium of claim 15, further comprising instructions that cause the machine to perform operations comprising creating a link between the first batch identifier and the second batch identifier.

17. The non-transitory computer-readable storage medium of claim 12, the generating of the genealogy including creating the links between the plurality of materials, the usage information, the handling unit, and the delivery information.

18. A system comprising:
    at least one processor; and
    modules comprising instructions that are executable by the at least one processor, the modules comprising:
        a monitoring module to identify a material associated with a product batch, access usage information associated with the material, identify a handling unit associated with the product batch, and access delivery information associated with the product batch; and a genealogy manager to generate a genealogy for the product batch based on links between the material, the usage information, the handling unit, and the delivery information.

19. The system of claim 18, further comprising a link manager to create links between the material, the usage information, the handling unit, and the delivery information.

20. The system of claim 18, the monitoring module further to identify a plurality of serial numbers associated with the product batch.

* * * * *